Sept. 20, 1955 C. JELINEK, JR 2,718,548

VARIABLE BLANKING FOR FACSIMILE TRANSMITTER

Filed Nov. 20, 1953 3 Sheets-Sheet 1

INVENTOR.
C. JELINEK, JR.

BY *Edward R. Hyde Jr.*

ATTORNEY

VARIABLE BLANKING FOR FACSIMILE TRANSMITTER

Filed Nov. 20, 1953 3 Sheets-Sheet 2

INVENTOR.
C. JELINEK, JR.
BY Edward R. Hyde Jr.
ATTORNEY

VARIABLE BLANKING FOR FACSIMILE TRANSMITTER

Filed Nov. 20, 1953 3 Sheets-Sheet 3

INVENTOR.
C. JELINEK, JR.
BY Edward R. Hyde Jr
ATTORNEY 2,718,548

VARIABLE BLANKING FOR FACSIMILE TRANSMITTER

Charles Jelinek, Jr., Verona, N. J., assignor to The Western Union Telegraph Company, New York, N. Y., a corporation of New York Application November 20, 1953, Serial No. 393,400

7 Claims. (Cl. 178—7.1)

This invention relates to facsimile apparatus and more particularly to blanking apparatus for a facsimile transmitter.

A conventional type facsimile transmitter comprises a rotary drum around which the message copy is wrapped. A scanning system comprising a light source and a photocell is caused to tranverse the rotating drum whereby the light beam is modulated in accordance with the message copy. The copy is secured to the drum by clamps, clips, or other suitable means. This copy mounting means is generally located on the drum in an area between the two edges of the copy message. With each rotation of the drum this underlap area which will vary in accordance with the width of the message sheet is scanned by the light beam which will be modulated by the mounting means or other marks on the drum in this underlap area thereby producing undesirable markings on the received copy.

It is therefore an object of this invention to provide a means for blanking transmission during the period in each revolution that the underlap area is scanned.

A further object of this invention is to provide a blanking arrangement that may be adjusted in accordance with the width of the message copy.

Another object of this invention is to provide for the transmission of a blanking signal during the blanking period of each revolution of the transmitter drum.

Accordingly a blanking switch is provided which when closed shunts the output of a facsimile transmitter thereby preventing transmission. This switch is controlled by two semicircular cams, one of which is fixed on the drum shaft and the other of said cams being adjustable in accordance with the width of the message copy. These cams rotate with the drum to effect closing of the blanking switch during the period that the underlap area is scanned.

The invention will be readily understood from a reading of the following description taken with the drawings in which.

Figure 1:
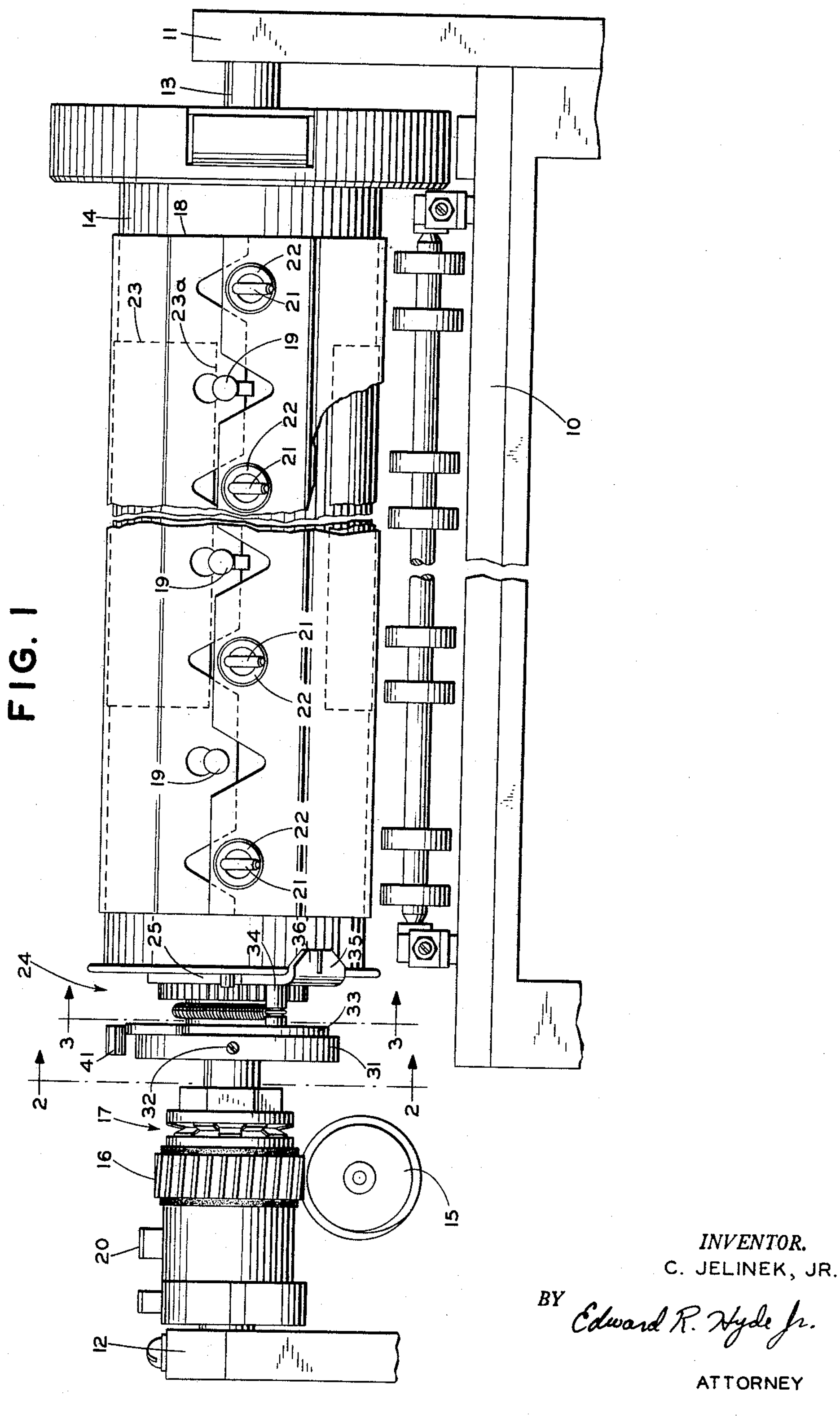
Fig. 1 is a front view of a facsimile transmitter.

Referring now to Fig. 1, there is shown a facsimile transmitter of the general type disclosed in the copending application of J. H. Hackenberg and R. J. Wise, Serial No. 330,003, filed January 7, 1953. Reference may be had to the latter application for the details of construction of the transmitter and message copy mounting means. Base 10 supports bearings 11 and 12 which mount a rotatable shaft 13. Transmitting drum 14 is secured to the shaft by any suitable means to rotate therewith. Shaft 13 is caused to rotate through worm 15, worm gear 16, and a friction clutch generally indicated at 17. A transparent wrapper 18 is secured to the drum by means of studs 19 and hooks 21 passing through eyelets 22, as fully disclosed in the above application. The message copy 23 is mounted on the drum underneath transparent wrapper 18 in such a position that leading edge 23*a* abuts against studs 19. The shaft 13 is provided with a braking mechanism 20.

Figure 3:
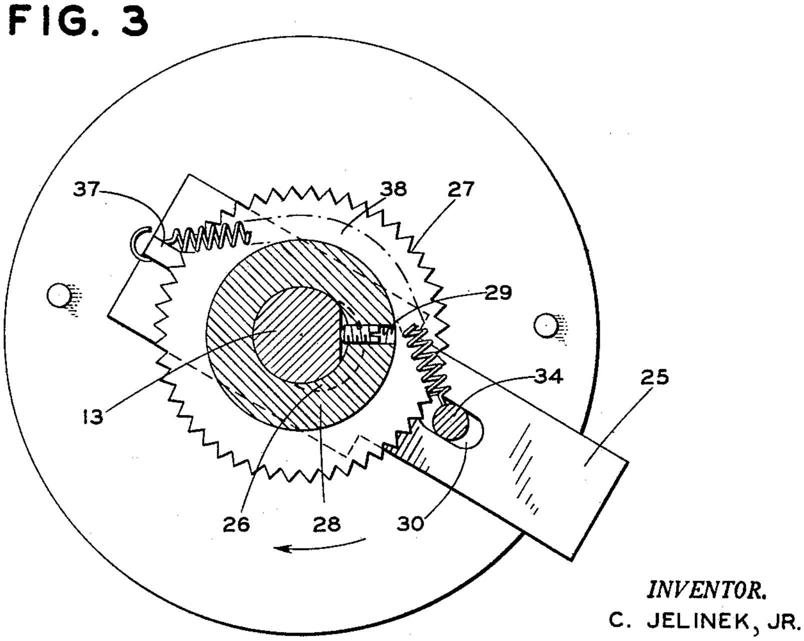
Fig. 3 is a section taken on the line 3—3 of Fig. 1.

Located on the shaft 13 at one end of drum 14 is the blanking mechanism generally indicated by numeral 24. A blanking pointer 25 has an elongated hole 26 (Fig. 3) therein whereby the pointer is mounted on shaft 13 adjacent the left end of drum 14. A serrated detent wheel 27 with a hub 28 is secured to the drum shaft by set screw 29. The distance between the inner edge of wheel 27 and the left end of drum 14 is such as to permit the blanking pointer to rotate freely. A cam 31 is fixed to shaft 13 by means of set screw 32 a distance from hub 28 to permit mounting of adjustable cam 33 which is free to rotate independently of shaft 13. A pin 34 is secured to adjustable cam 33 by any suitable means, and extends parallel with the shaft 13 to be received by an elongated hole 30 (Fig. 3) in the blanking pointer 25. One end 35 of the blanking pointer is bent over in the direction of the drum and is marked as at 36 for a purpose hereinafter to be described. The other end of blanking pointer 25 has a wedge-shaped lug 37 secured thereto cooperating with wheel 27. A tension spring 38 is secured at one end to lug 37 and at the other end to pin 34 and passes halfway around hub 28. It is seen therefore that tension spring 38 urges the blanking pointer radially outward and causes lug 37 to engage with the teeth of wheel 27. With the wheel 27 secured to shaft 13 and rotating therewith, the loosely mounted blanking pointer is therefore also caused to rotate with the shaft, and through pin 34 the adjustable cam 33 likewise is caused to rotate. It is also readily seen that the relative position of the two cams may be manually set by pressing blanking pointer 25 radially inward to disengage lug 37 and wheel 27 so that the pointer can be rotated to a desired position thus setting the cam 33.

Figure 2:
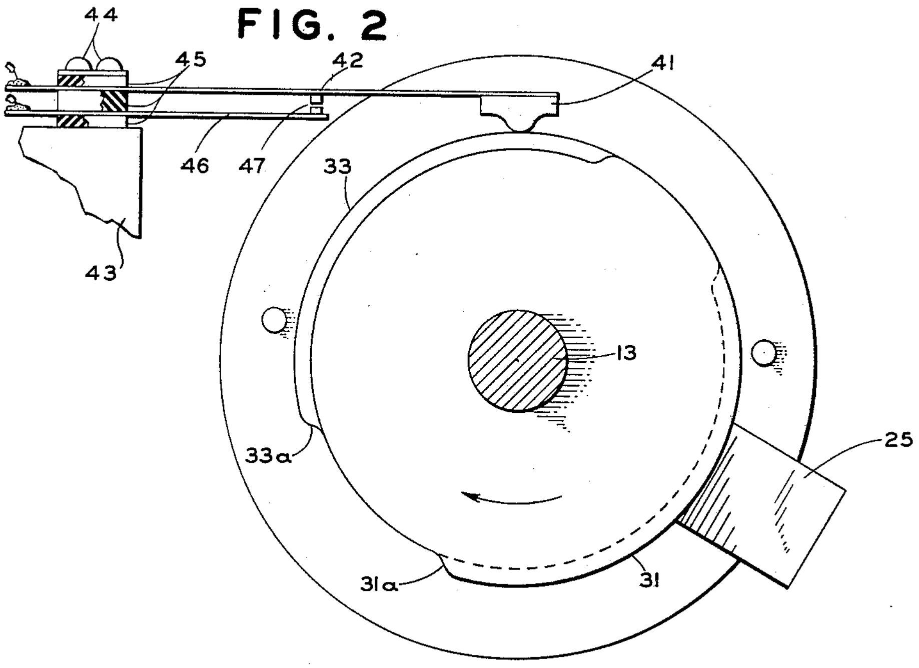
Fig. 2 is a section taken on the line 2—2 of Fig. 1.

A blanking switch generally indicated by numeral 40 is shown in Fig. 2. Cam follower 41 is secured to contact arm 42 which is mounted on a portion of the transmitter frame 43 by means of screws 44 and insulating blocks 45. Contact arm 46 is also secured to frame 43 and is located just below contact arm 42. Contacts 47 are secured by any suitable means to contact arms 42 and 46. The cam follower is located to ride over the periphery of cams 31 and 33. The cams are of similar contour, each having a raised portion throughout one half of its circumference and a drop portion throughout the other half. As shown in Fig. 2, when the cam follower rides on the raised portion of either cam, contacts 47 are held apart. When the cam follower is permitted to fall by the drop portions of the cams, the contacts close to effect blanking.

It is seen that blanking occurs only during the interval that the cam follower is permitted to ride on the drop portions of both cams, the raised portion of either cam functioning to maintain the cam follower in the raised position. The interval of coincidence of the drop portions will depend upon the relative angular positions of the cams, which are adjustable as set forth above.

Figure 4:
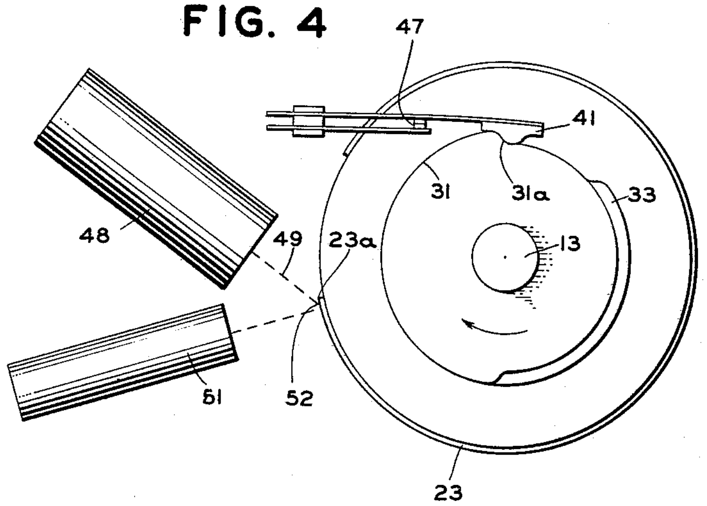
Fig. 4 shows diagrammatically the relative position of the cams, message copy and scanning beam at the end of blanking.
Figure 5:
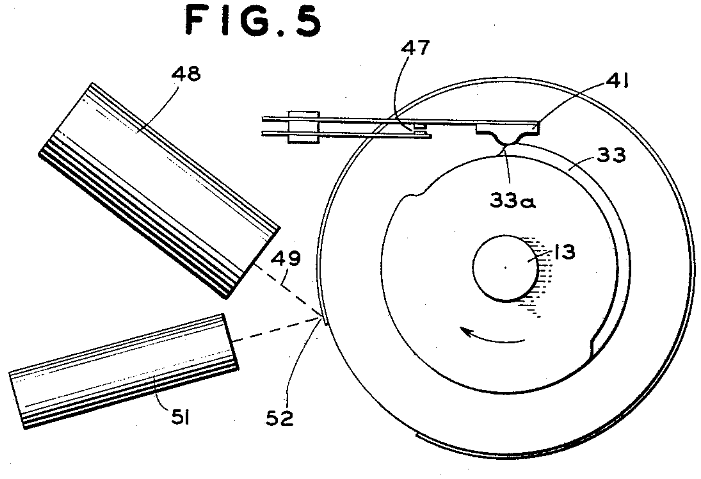
Fig. 5 is similar to Fig. 4 but shows the condition at the commencement of blanking.

Figs. 4 and 5 shows the relative positions of the scanning and blanking elements at the end and beginning, respectively, of the blanking period. A light source 48 provides a scanning beam 49 which is reflected from the surface of the drum and received by photocell 51. Cam 31 is positioned on shaft 13 so that the trailing edge 31*a* of the lowered section is under follower 41 as the leading edge 23*a* of the message sheet passes the scanning beam as seen in Fig. 4. The leading edge 23*a* of a message sheet is at a fixed position on the drum regardless of the size of the sheet since each sheet is mounted with this edge abutting studs 19. Adjustable cam 33 and blanking pointer 25 are assembled so that the angular distance between the pointer and the trailing edge 33*a* of the raised portion of cam 33 is equal to the angular distance between follower 41 and scanning point 52.

After a message sheet is mounted on the drum, pointer 25 is manually rotated to a point where marker 36 (Fig. 1) is aligned with the trailing edge of the sheet. This position will of course depend upon the width of the particular sheet mounted upon the drum. This setting will position cam 33 so that the trailing edge 33*a* of its raised portion will arrive under the cam follower 41 as the trailing edge of the message passes scanning point 52 as shown in Fig. 5. Since the leading edge of the raised portion of cam 31 passes under the cam follower 41 as the leading edge of the message sheet passes the scanning point 52, the blanking interval, defined by the coinciding lowered portions of the two cams is equal to the time that the underlap area on the drum is being scanned by the light beam.

Figures 6, 7:
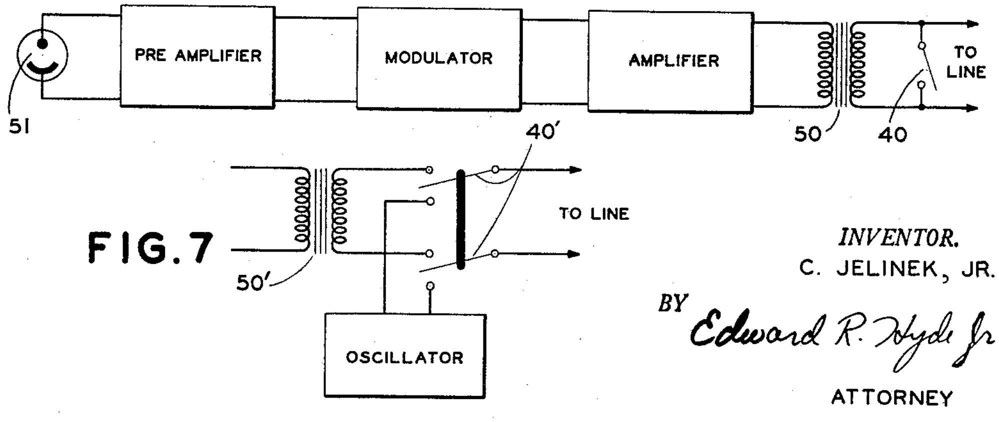
Fig. 6 is a block diagram of a facsimile transmitter showing the blanking switch.
Fig. 7 is a modification of a portion of the circuit of Fig. 6.

Fig. 6 shows one arrangement for connecting switch 40 to selectively cause blanking of the phototube output. The switch 40 is connected across the secondary of output transformer 50 and operates to shunt the output upon closing thereby preventing transmission regardless of the intensity of light received by phototube 51.

It is sometimes desirable to transmit a blanking signal during the blanking period. For example, in transmitting a negative of the message copy, the scanning of white background causes a signal to be applied to the line. In order that the blanking area on the received copy appears as white background, it is necessary to apply a signal to the line corresponding to the signal produced by the white background. In the present invention, an oscillator is provided, the output of which is coupled through a selectively operated switch to the line. The oscillator is tuned to produce a signal corresponding to the signal produced by the background of the message copy.

An arrangement employing a blanking signal is shown in Fig. 7. The switch 40 of Fig. 6 is replaced by a switch 40′ which normally connects output transformer 50′ to the line. Actuation of switch 40′ will open the transmitter circuit and connect the oscillator to the outgoing line. Switch 40′ is of course actuated in the same manner as switch 40, that is during the blanking interval.

Though the present invention has been disclosed by reference to a specific embodiment thereof, it is understood that various modifications can be made and equivalents substituted without departing from the scope of the invention as defined in the appended claims.

What is claimed is:

1. A facsimile transmitter comprising a rotatable drum adapted to have a copy sheet mounted on the surface thereof, means for scanning the surface of said drum, an output circuit connected to said scanning means, blanking means operable to control said output circuit, said blanking means comprising switch means adapted to effect a blanking period during each rotation of said drum and a plurality of cams rotating in synchronization with said drum to control said switch means, one of said plurality of cams being adjustable with respect to another one of said plurality of cams whereby the blanking period effected by said switch means may be varied, signal producing means and means controlled by said switch means to connect said signal producing means to said output circuit.

2. A facsimile transmitter comprising a rotatable drum adapted to mount a copy sheet wherein the width of the underlap area between the trailing edge and leading edge of the said sheet will vary in accordance with the width of each copy sheet, means for scanning the surface of said drum, an output circuit connected to said scanning means, blanking means connected to said output circuit to prevent transmission during a predetermined period of each revolution of said drum, said blanking means comprising a switch operable to effect said blanking period, first and second rotatable cams synchronized with the rotation of said drum to actuate said switch means, said first rotatable cam being fixedly mounted in accordance with a predetermined location on said drum corresponding to the position of one edge of the copy sheet mounted thereon, said second rotatable cam being adjustably mounted whereby its angular position may be varied in accordance with the position of the opposite edge of said copy sheet on said drum, and means to apply a blanking signal to said output circuit during the blanking period.

3. A facsimile transmitter comprising a rotatable drum adapted to mount a copy sheet wherein the width of the underlap area between the trailing edge and leading edge of said sheet will vary in accordance with the width of each copy sheet, means for scanning the surface of said drum, an output circuit connected to said scanning means, blanking means operable to prevent transmission during a predetermined period of each revolution of said drum, said blanking means comprising a switch operable to effect said blanking period, a first cam fixedly mounted with respect to one edge of the copy sheet on said drum, a second cam adjustably mounted whereby its angular position may be set in accordance with the other edge of said copy sheet, a cam follower, said first and second cams being located adjacent each other whereby the cam follower rides over both of said cams and means whereby said cam follower controls said switch.

4. A facsimile transmitter comprising a rotatable drum adapted to mount a copy sheet wherein the width of the underlap area between the trailing edge and leading edge of said sheet will vary in accordance with the width of each copy sheet, means for scanning the surface of said drum, an output circuit connected to said scanning means, blanking means operable to prevent transmission during a predetermined period of each revolution of said drum, said blanking means comprising a switch operable to effect said blanking period, a first cam having a raised portion and a drop portion fixedly mounted with respect to one edge of said copy sheet on the drum, a second cam having a raised portion and a drop portion adjustably mounted whereby its angular position may be set in accordance with the other edge of said copy sheet, a cam follower, said first and second cams being located adjacent each other to present a continuous cam surface for said cam follower and means whereby said cam follower controls said blanking switch.

5. A facsimile transmitter comprising a rotatable drum, means to mount a copy sheet on said drum wherein the width of the underlap area between the trailing and leading edges of the sheet will vary in accordance with the width of each copy sheet, a rotatable shaft synchronized with said drum, means for scanning the surface of said drum, an output circuit connected to the scanning means, blanking means connected to said output circuit to prevent transmission during a predetermined period of each revolution of the drum, said blanking means comprising switch means, first rotatable means secured to said shaft in accordance with a predetermined location on said drum corresponding to the position of one edge of the copy sheet mounted thereon, second rotatable means adjustably mounted on said shaft, means to angularly adjust said second rotatable means independently of said copy sheet mounting means and means controlled by said first and second rotatable means to selectively operate said switch means.

6. A facsimile transmitter comprising a rotatable drum, means to securely mount a message sheet on said drum wherein the width of the underlap area between the trailing and leading edges of the message sheet will vary in accordance with the width of each sheet, a rotatable shaft synchronized with said drum, means for scanning the surface of the drum, an output circuit connected to the scanning means, blanking means connected to said output circuit to prevent transmission during a predetermined period of each revolution of the drum, said blanking means comprising switch means, a first rotatable member secured to said shaft and having a switch operating portion throughout part of the periphery thereof, a second rotatable member adjustably mounted on said shaft and having a switch operating portion throughout part of the periphery thereof, said switch means being located to be controlled by said first and second rotatable members, said first rotatable member being angularly oriented with respect to said mounting means whereby said switch means is operated as the leading edge of a message sheet is scanned during each rotation of said drum, said second rotatable member having adjustable means whereby the angular position thereof may be set to operate the switch means to initiate blanking, said adjustable means being operable to angularly position said second rotatable member independently of said message mounting means.

7. The combination defined in claim 6 wherein said adjustable means comprises a detent wheel secured to said rotatable shaft, latch means engageable with said detent wheel and adapted to be angularly positioned with respect to said shaft, means mechanically linking the second rotatable member with said latch means and radially slidable means operable to release said latch means.

References Cited in the file of this patent

UNITED STATES PATENTS

| | | |
|---|---|---|
| 2,263,332 | Finch | Nov. 18, 1941 |
| 2,618,702 | Thompson | Nov. 18, 1952 |